United States Patent Office 3,388,134
Patented June 11, 1968

---

3,388,134
1,2,3,4 - TETRAHYDRONAPHTH[2,3-b]INDOLO
[2,3-d]THIOPYRYLIUM COMPOUNDS AND
PROCESSES FOR THEIR PRODUCTION
Thomas E. Young, Bethlehem, Pa., and Peter H. Scott,
Guilford, Conn., assignors to Warner-Lambert Pharmaceutical Company, Morris Plains, N.J., a corporation
of Delaware
No Drawing. Continuation-in-part of application Ser. No.
475,227, July 27, 1965. This application May 23, 1966,
Ser. No. 551,957
7 Claims. (Cl. 260—326.9)

ABSTRACT OF THE DISCLOSURE

This invention relates to 1,2,3,4-tetrahydronaphth[2,3-b]indolo[2,3-d]thiopyrylium compounds of the formula.

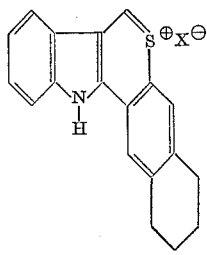

wherein $X^\ominus$ is perchlorate or halide.

These compounds are useful as anti-bacterial and antifungal agents.

---

This application is a continuation-in-part of application Ser. No. 475,227, filed July 27, 1965 for 1,2,3,4-Tetrahydronaphth[2,3-b]indolo[2,3-d]thiopyrylium Compounds and Process for Their Production, and now abandoned.

This invention relates to 1,2,3,4-tetrahydronaphth[2,3-b]indolo[2,3-d]thiopyrylium compounds and to intermediate compounds and processes useful for preparing them. More particularly, the present invention relates to a new class of compounds having the following formula:

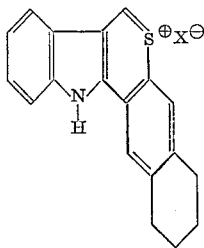

I wherein $X^\ominus$ is perchlorate or halide, e.g. chloride, bromide, iodide, or fluoride.

The 1,2,3,4-tetrahydronaphth[2,3-b]indolo[2,3-d]thiopyrylium compounds of Formula I are useful as antibacterial and antifungal agents, particularly against gram positive bacteria, e.g. *Staphylococcus aureus*, etc., and fungi, e.g. *Candida albicans*, etc.

The compounds of Formula I can be mixed with pharmaceutical adjuvants, and the resulting mixtures formed into suitable salves, ointments, and powders for topical and otic administration.

Topical ointment bases that can be employed with the compounds of Formula I are those standard in the pharmaceutical compounding art, e.g. those having a base composed of one or more of the following: animal fats, animal waxes, essential oils, hydrogenated oils, lanolin, olive oil, paraffins, etc. Examples of the above include wool alcohols, wool fat either alone or mixed with lard or paraffin, hydrogenated palm kernel oil, hydrogenated castor oil, etc. Additionally, oil-in-water and water-in-oil bases described in the United States Pharmacopeia can also be used. Hardening agents such as beeswax can be incorporated in the above.

The compounds of Formula I are employed in a therapeutically effective amount in the above ointment bases. They can be applied to the broken or unbroken skin of the animal body, and water soluble bases can also be used for otic application.

Also, a therapeutically effective amount of a compound of Formula I can be used in a talcum powder base for use as a topical dusting powder. What constitutes a therapeutically effective amount of the compounds of Formula I is dependent on various factors such as the particular base employed, the nature and site of the infection, etc. Generally, amounts ranging from about 0.1 to about 5.0%, e.g. about 1%, in the above ointment and powder bases are advantageously employed, although quantities above and below these amounts can also be employed and are within the scope of the instant invention.

The compounds of Formula I are prepared by first reacting a phenylhydrazone compound of Formula II with glacial acetic acid to give 1,2,3,4,7,12-hexahydronaphth[2,3-b]indolo[2,3-d]thiopyran of Formula III according to the following reaction scheme:

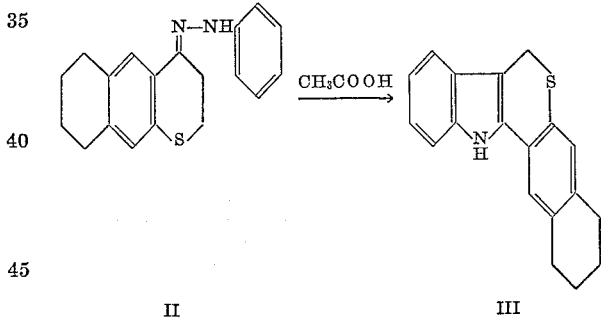

II                    III

Thereafter, the 1,2,3,4,7,12-hexahydronaphth[2,3-b]indolo[2,3-d]thiopyran (III) is reacted with a perchlorate such as trityl perchlorate to prepare the corresponding 1,2,3,4 - tetrahydronaphth[2,3 - b]indolo[2,3 - d]thiopyrylium perchlorate (Ia) according to the following reaction scheme:

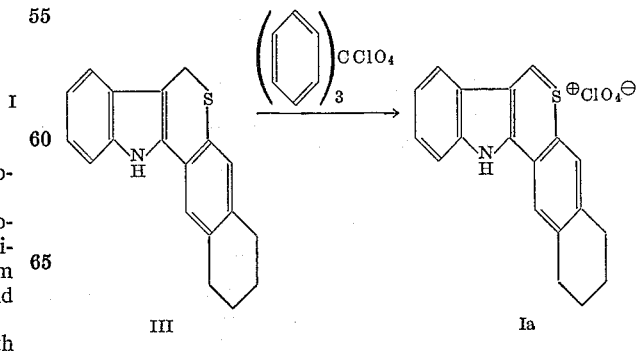

III                    Ia

The perchlorate (Ia) can next be treated with ammonia to effect formation of 1,2,3,4-tetrahydronaphth[2,3-b]indolo[2,3-d]thiopyran IV, as shown below.

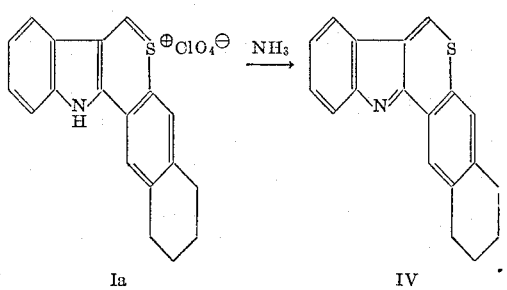

Ia    IV

The thiopyran of Formula IV is then reacted with a hydrogen halide in a benzene reaction medium according to the following reaction scheme:

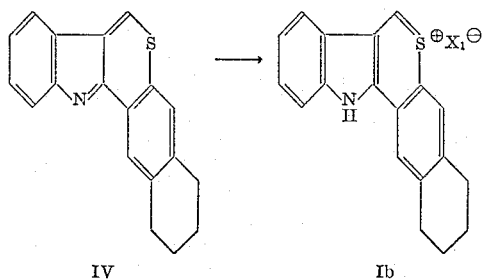

IV    Ib wherein $X_1^\ominus$ is halide.

The practice of the present invention is further illustrated by the following examples:

EXAMPLE 1

1,2,3,4,7,12-hexahydronaphth[2,3-b]indolo[2,3-d]thiopyran

The precursor, 6,7,8,9-tetrahydrobenzo[g]thiochromanone phenyl hydrazone, is prepared as follows: To a solution of 5.69 g. (0.0261 mole) of 6,7,8,9-tetrahydrobenzo[g]thiochromanone [F. Krollpfeiffer and H. Schultze, Ber. 56, 1819 (1923)] in 150 ml. of methanol in a nitrogen atmosphere is added five drops of glacial acetic acid and 2.7 ml. of phenylhydrazine. The solution is refluxed for five minutes, then allowed to stand at room temperature until the phenylhydrazone precipitates. The mixture is then chilled in a refrigerator, after which the precipitate is collected by filtration and washed with 150 ml. of fresh methanol. The pale yellow product weighs 6.76 g. (84%) and melts at 189–192° (sealed tude). Several recrystallizations from methanol, under nitrogen, affords an analytical sample, M.P. 190–193° (sealed tube).

Analysis for $C_{19}H_{20}N_2S$.—Calc'd: C, 73.98; H, 6.54; N, 9.08; S, 10.39. Found: C, 73.75; H, 6.52; N, 8.97; S, 10.27.

A stirred suspension of 3.00 g. (9.75 millimoles) of 6,7,8,9 - tetrahydrobenzo[g]thiochromanone phenylhydrazone in 30 ml. of glacial acetic acid under nitrogen is greatly refluxed. The phenylhydrazone slowly dissolves to give a pale yellow solution which after dissolution is complete, is refluxed two additional hours. The cooled solution yields 2.15 g. of light brown needles having a melting point of 150–170° C. Recrystallization from benzene-cyclohexane gives 1.58 g. of product having a melting point of 175–180° C. with some material still unmelted at 200° C. This product is next refluxed with pure cyclohexane. 0.30 g. of cyclohexane-insoluble residue having a melting point of 180° C. to >200° C. results. The cyclohexane when cooled yields 0.80 g. (28%) of the desired indole as yellow crystals having a melting point of 176–182° C. Repeated recrystallization from 60–70° C. petroleum ether gives analytically pure pale yellow crystals having a melting point of 183–184.5° C.

Analysis for $C_{19}H_{17}NS$.—Calc'd: C, 78.31; H, 5.88; S, 11.00. Found: C, 78.11; H, 588; S, 11.03.

EXAMPLE 2

1,2,3,4-tetrahyronaphth[2,3-b]indolo[2,3-d]thiopyrylium perchlorate

A suspension of 1.00 g. (3.24 millimoles) of 6,7,8,9-tetrahydrobenzo[g]thiochromanone phenylhydrazone in 50 ml. of acetic acid is gently refluxed in a nitrogen atmosphere. Within twenty minutes the solid completely dissolves and after 2½ hours, 1.12 g. (3.26 millimoles) of trityl perchlorate is added. The mixture is stirred for ½ hour without further heating after which it is allowed to stand overnight. A yellow solid product is collected by filtration and the product is washed with anhydrous ether. The yield is found to be 0.91 g. (73%), and the product is found to have a melting point of 290° C. decomp. Several recrystallizations from nitromethane affords an analytical sample having a melting point of 286–287° C. decomp.

Analysis for $C_{19}H_{16}ClNO_4S$.—Calc'd: C, 58.53; H, 4.14; S, 8.22. Found: C, 58.69; H, 4.65; S, 7.99.

EXAMPLE 3

1,2,3,4-tetrahydronaphth[2,3-b]indolo[2,3-d]thiopyran

Gaseous ammonia is bubbled slowly for one hour through a slurry of 1.93 g. (4.95 millimoles) of product prepared by the procedure of Example 2 in 75 ml. of benzene. The mixture is then filtered, and the precipitate is washed with fresh benzene. Evaporation of the combined filtrate and washing on a rotary evaporator gives 1.24 g. of orange solid which melts at 98° C., resolidifies above 112° C. and remelts at 189–192° C. This solid is heated in 200 ml. of boiling 60–70° petroleum ether, and after most of the solvent has evaporated, the precipitate is recollected. The recovered product is found to weigh 1.08 g. (76%) and has a melting point of 186–194° C. Several recrystallizations from acetonitrile afford an analytical sample having a melting point of 195–197° C.

Analysis for $C_{19}H_{15}NS$.—Calc'd: C, 78.86; H, 5.23; S, 11.09. Found: C, 78.79; H, 5.31; S, 11.12.

EXAMPLE 4

1,2,3,4-tetrahydronaphth[2,3-b]indolo[2,3-d]thiopyrylium chloride

Ammonia is bubbled for 30 minutes through a slurry of 2.77 g. (7.11 millimoles) of the product prepared by the procedure of Example 2 in benzene. The mixture is then filtered, and the precipitate is washed with fresh benzene. The combined benzene solutions are next evaporated on a steam bath, after which the residue is redissolved in benzene and the benzene again evaporated to assure complete removal of ammonia. The residue is again redissolved in benzene, and gaseous hydrogen chloride is bubbled through the solution for fifteen minutes. The resulting precipitate is collected by filtration, washed with benzene, and air dried. The crude product (2.22 g.) when recrystallized from methanol and dried at 65°/0.05 mm. yields 1.86 g. of brownish-orange needles having a melting point with gradual decomp. above 280° C. with darkening above 260° C. A 314.4 mg. sample redried at 137°/0.05 mm. gives 300.1 mg. of analytically pure compound having a melting point with gradual darkening and decomp. above 280° C.

Analysis for $C_{19}H_{16}ClNS$.—Calc'd: C, 70.03; H, 4.95; Cl, 10.88; S, 9.84. Found: C, 69.80; H, 4.65; Cl, 10.89; S, 9.74.

EXAMPLE 5

A salve for topical administration is prepared from the following ingredients:

| | Parts by weight |
|---|---|
| 1,2,3,4 - tetrahydronaphth[2,3 - b]indolo[2,3 - d]thiopyrylium chloride | 10 |
| Hydrogenated castor oil | 60 |
| Hard paraffin | 160 |
| Soft paraffin | 170 |
| Liquid paraffin | 160 |

The hydrogenated castor oil, hard paraffin, soft paraffin and liquid paraffin are heated together to form a melt, thoroughly mixed, and the chloride, in powder form, added thereto with stirring. The resulting mixture is allowed to cool, and then placed in suitable containers.

It is understood that the foregoing detailed description is given merely by way of illustration and that many variations may be made therein without departing from the spirit of the invention.

What is claimed is:

1. A compound of the formula:

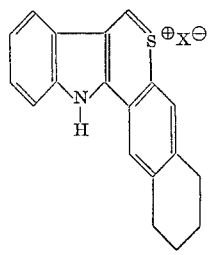

I wherein $X^{\ominus}$ is halide or perchlorate.

2. 1,2,3,4 - tetrahydronaphth[2,3-b]indolo[2,3-d]thiopyrylium perchlorate.
3. 1,2,3,4 - tetrahydronaphth[2,3-b]indolo[2,3-d]thiopyrylium chloride.
4. 1,2,3,4,7,12 - hexahydronaphth[2,3-b]indolo[2,3-d]thiopyran.
5. 1,2,3,4 - tetrahydronaphth[2,3-b]indolo[2,3-d]thiopyran.
6. A method for preparing a compound of claim 1 wherein the compound of Formula Ia having the structural formula:

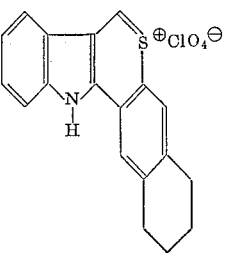

Ia is reacted with ammonia to form a compounds of the formula:

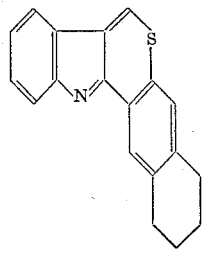

IV which is thereafter reacted with a hydrogen halide to form a compound of the formula:

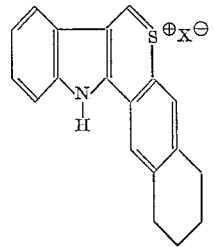

Ib wherein $X^{\ominus}$ is halide.

7. The method of claim 6 wherein the hydrogen halide is hydrogen chloride.

References Cited

Kiang et al., Jour. Chem. Soc., 1951, pages 1909–1914, QD1. C6.

Luttringhaus et al., Naturwissenschaften, Vol. 44 (1957), pages 584–585. Q 3. N7.

NICHOLAS S. RIZZO, *Primary Examiner.*

J. A. NARCAVAGE, *Assistant Examiner.*